US007913051B1

(12) United States Patent
Todd et al.

(10) Patent No.: US 7,913,051 B1
(45) Date of Patent: Mar. 22, 2011

(54) METHODS AND APPARATUS FOR INCREASING THE STORAGE CAPACITY OF A ZONE OF A STORAGE SYSTEM

(75) Inventors: Stephen J. Todd, Shrewsbury, MA (US); Tom Teugels, Schoten (BE); Jan F. Van Riel, Geel (BE)

(73) Assignee: EMC Corporation, Hopkinton, MA (US)

( * ) Notice: Subject to any disclaimer, the term of this patent is extended or adjusted under 35 U.S.C. 154(b) by 600 days.

(21) Appl. No.: 11/644,857

(22) Filed: Dec. 22, 2006

(51) Int. Cl.
*G06F 12/02* (2006.01)
*G06F 12/10* (2006.01)
(52) U.S. Cl. .. 711/165; 711/202; 711/108; 711/E12.014
(58) Field of Classification Search .................. 711/153, 711/165, 173, 202
See application file for complete search history.

(56) References Cited

U.S. PATENT DOCUMENTS

| 5,758,118 | A  | * | 5/1998  | Choy et al. ................... 711/114 |
| 7,028,158 | B1 | * | 4/2006  | Beatty et al. ................. 711/202 |
| 7,600,083 | B2 | * | 10/2009 | Aggarwal et al. ............. 711/154 |
| 2004/0267830 | A1 | * | 12/2004 | Wong et al. ................... 707/200 |
| 2005/0125625 | A1 | * | 6/2005  | Kilian et al. .................. 711/202 |
| 2005/0193084 | A1 | * | 9/2005  | Todd et al. .................... 709/214 |
| 2006/0026219 | A1 | * | 2/2006  | Orenstein et al. ............. 707/204 |
| 2006/0206671 | A1 | * | 9/2006  | Aiello et al. .................. 711/148 |
| 2006/0259686 | A1 | * | 11/2006 | Sonobe ......................... 711/114 |
| 2006/0282485 | A1 | * | 12/2006 | Aggarwal et al. ............. 707/206 |
| 2007/0073990 | A1 | * | 3/2007  | Snaman et al. ............... 711/165 |
| 2007/0192560 | A1 | * | 8/2007  | Furuhashi ..................... 711/170 |
| 2008/0052478 | A1 | * | 2/2008  | Kubo et al. ................... 711/162 |

* cited by examiner

*Primary Examiner* — Matt Kim
*Assistant Examiner* — Hal Schnee
(74) *Attorney, Agent, or Firm* — Krishnendu Cupta; Robert Kevin Perkins; Joseph D'Angelo (57) ABSTRACT

Some embodiments are directed to a technique for storing and/or locating content units stored on an object addressable storage (OAS) system, wherein each content unit is identified by an object identifier. The OAS system may comprise a plurality of zones, each of which stores content units. A mapping process may be defined that maps object identifiers for content units to zones on the OAS system. Thus, the storage location for a content unit on the OAS system may be the zone on the OAS system to which the object identifier for the content unit maps.

14 Claims, 5 Drawing Sheets

METHODS AND APPARATUS FOR INCREASING THE STORAGE CAPACITY OF A ZONE OF A STORAGE SYSTEM

BACKGROUND

1. Field of Invention

The present invention relates to methods and apparatus for accessing content in a storage system.

2. Description of the Related Art

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using a block address that identifies a logical volume in which the data is stored and the blocks within that logical volume where the data is located. Such storage systems are known as "block I/O" storage systems. Although the logical volumes presented by the storage system to the host may not map in a one-to-one manner to physical storage devices, they are perceived by the host as corresponding to physical storage devices, and the specification of a logical volume and block address influences where the referenced data is physically stored within the storage system.

In contrast to block I/O storage systems, some storage systems receive and process access requests that identify a unit of data or other content unit using an object identifier, rather than an address that specifies where the data unit is physically or logically stored in the storage system. Such storage systems are referred to herein as object addressable storage (OAS) systems. In object addressable storage, a content unit may be identified (e.g., by host computers requesting access to the content unit) using an object identifier that is independent of the physical or logical location at which the content unit is stored (although it is not required to be independent). From the perspective of the host computer (or user) accessing a content unit on an OAS system, the object identifier does not control where the content unit is stored. Thus, in an OAS system, if the physical or logical location at which the unit of content is stored changes, the identifier by which host computers access the unit of content may remain the same. In contrast, in a block I/O storage system, if the physical or logical location at which the unit of content is stored changes, host computers accessing the unit of content may need to be made aware of the location change and then use the new physical or logical address of the unit of content for future accesses.

One type of an OAS system is a content addressable storage (CAS) system. In a CAS system, the object identifiers that identify content units are content addresses. A content address is an identifier that is computed, at least in part, from at least a portion of the content of its corresponding unit of content, which can be data and/or metadata. For example, a content address for a unit of content may be computed by hashing the unit of content and using the resulting hash value as the content address. Storage systems that identify content by a content address are termed content addressable storage (CAS) systems.

SUMMARY

One embodiment is directed to a method of processing content in a computer system comprising at least one host and at least one storage system that comprises a plurality of zones. The at least one host accesses content units stored on the at least one storage system using object identifiers, and the computer system maps each object identifier to one of the plurality of zones on the at least one storage system to which the corresponding content unit is allocated for storage. The method comprises acts of: receiving a request to store a first content unit, the request specifying at least a portion of a first object identifier for the first content unit; determining that the at least a portion of the first object identifier maps to a first one of the plurality of zones that is unavailable to store the first content unit; and in response to determining that the first one of the plurality of zones is unavailable to store the first content unit, modifying the at least a portion of the first object identifier to create at least a portion of a second object identifier for the first content unit that maps to a second one of the plurality of zones that is available to store the first content unit. Another embodiment is directed to at least one computer readable medium encoded with instructions that, when executed in a computer system, perform the above-described method.

A further embodiment is directed to at least one storage system a computer system configured to process access requests from at least one host to access content units stored on the at least one storage system using object identifiers. The at least one storage system comprises: a plurality of zones, each of which is configured to store content units; and at least one controller that: receives a request to store a first content unit, the request specifying at least a portion of a first object identifier for the first content unit; determines that the at least a portion of the first object identifier maps to a first one of the plurality of zones that is unavailable to store the first content unit; and when it determines that the first one of the plurality of zones is unavailable to store the first content unit, modifies the at least a portion of the first object identifier to create at least a portion of a second object identifier for the first content unit that maps to a second one of the plurality of zones that is available to store the first content unit.

Another embodiment is directed to a method of processing content in a computer system comprising at least one host and at least one storage system that comprises a plurality of zones, wherein the at least one host accesses content units stored on the at least one storage system using object identifiers, wherein the computer system maps each object identifier to one of the plurality of zones on the at least one storage system to which the corresponding content unit is allocated for storage. The method comprises acts of: receiving, at the at least one storage system, a request from the at least one host to store a first content unit, the request specifying at least a portion of a first object identifier for the first content unit; modifying the at least a portion of the first object identifier to create at least a portion of a second object identifier for the first content unit; and providing the at least a portion of the second object identifier to the at least one host. A further embodiment is directed to at least one computer readable medium encoded with instructions that, when executed on a computer system, perform the above-described method.

Another embodiment is directed to at least one storage system that process access requests from at least one host that accesses content units stored on the at least one storage system using object identifiers. The at least one storage system comprises: a plurality of zones, each of which is configured to store content units; and at least one controller that: receives a request from the at least one host to store a first content unit, the request specifying at least a portion of a first object identifier for the first content unit; modifies the at least a portion of the first object identifier to create at least a portion of a second object identifier for the first content unit; and provides the at least a portion of the second object identifier to the at least one host.

A further embodiment is directed to a method of processing a transaction that comprises storing a plurality of content units on at least one storage system in a computer system comprising at least one host and the at least one storage system, wherein the at least one storage system comprises a plurality of zones, wherein each content unit stored on the at least one storage system is associated with an object identifier that includes at least a portion that is used to map to one of the plurality of zones on the at least one storage system on which the corresponding content unit is to be stored. The method comprises acts of: sending, to the at least one storage system, a first request to store a first of the plurality of content units in the transaction, the first request comprising a first identifier that comprises at least a portion of the object identifier for the first of the plurality of content units and maps to a first one of the plurality of zones; receiving from the at least one storage system, in response to the first request, a second identifier that maps to a second one of the plurality of zones; and sending, to the at least one storage system, a second request to store a second of the plurality of content units in the transaction, the second request comprising the second identifier that comprises at least a portion of the object identifier for the second of the plurality of content units. Another embodiment is directed to at least one computer readable medium encoded with instructions that, when executed on a computer system, perform the above-described method.

A further embodiment is directed to at least one host computer configured to store a plurality of content units on at least one storage system in a computer system comprising the at least one host and the at least one storage system, wherein the at least one storage system comprises a plurality of zones, wherein each content unit stored on the at least one storage system is associated with an object identifier that includes at least a portion that is used to map to one of the plurality of zones on the at least one storage system on which the corresponding content unit is to be stored. The at least one host computer comprises: at least one input/output (I/O) interface; and at least one controller that: sends, to the at least one storage system via the at least one I/O interface, a first request to store a first of the plurality of content units in the transaction, the first request comprising a first identifier that comprises at least a portion of the object identifier for the first of the plurality of content units and maps to a first one of the plurality of zones; receives from the at least one storage system via the at least one I/O interface, in response to the first request, a second identifier that maps to a second one of the plurality of zones; and sends, to the at least one storage system via the at least one I/O interface, a response that responds to receipt of the second identifier.

Another embodiment is directed to a method of processing content in a computer system comprising at least one host and at least one storage system that comprises a plurality of zones, each of the zones employing at least one storage resource that is not employed by any other of the plurality of zones, wherein the at least one host accesses content units stored on the at least one storage system using object identifiers and the computer system parses at least a portion of the object identifier for a content unit to determine which of the plurality of zones the content unit is allocated to for storage. The method comprises acts of: in response to receipt of a request to store a first content unit for which the at least a portion of the object identifier maps to a first zone of the plurality of zones that has an amount of at least one storage resource available that is below at least one threshold, adding a new zone to the plurality of zones; and transferring at least some of the content stored on the first zone to the new zone. A further embodiment is directed to at least one computer readable medium encoded with instructions that, when executed on a computer system, perform the above-described method.

Another embodiment is directed to at least one storage system configured to process access requests from at least one host computer that accesses content units on the at least one storage system using object identifiers. The at least one storage system comprises: a plurality of zones, each of which employs at least one storage resource that is not employed by any other of the plurality of zones; and at least one controller that: in response to receipt of a request to store a first content unit for which the at least a portion of the object identifier maps to a first zone of the plurality of zones that has an amount of at least one first storage resource available that is below at least one threshold, allocates, to the first zone, at least one second storage resource to increase the storage capacity of the zone; and transfers at least some of the content stored on the at least one first storage resource to the at least one second storage resource.

A further embodiment is directed to a method of processing content in a computer system comprising at least one host and at least one storage system that comprises a plurality of zones, each of the zones employing at least one storage resource that is not employed by any other of the plurality of zones, wherein the at least one host accesses content units stored on the at least one storage system using object identifiers, wherein the computer system comprises parsing information that defines how at least a portion of the object identifier for a content unit is to be parsed to determine which of the plurality of zones the content unit is allocated to for storage. The method comprises acts of: in response to receipt of a request to store a first content unit, wherein the at least a portion of the object identifier for the first content unit maps to a first zone of the plurality of zones that has an amount of at least one storage resource available that is below at least one threshold, revising the parse information to split the first zone into at least two zones including the first zone and at least one new zone so that object identifiers that mapped to the first zone before the split map to either the first zone or the at least one new zone after the split. Another embodiment is directed to at least one computer readable medium encoded with instructions that, when executed on a computer system, perform the above-described method.

A further embodiment is directed to at least one storage system comprising: a plurality of zones, each of which employs at least one storage resource that is not employed by any other of the plurality of zones; a memory for storing parsing information that defines how at least a portion of an object identifier for a content unit is to be parsed to determine which of the plurality of zones the content unit is allocated to for storage; and at least one controller that: in response to receipt of a request to store a first content unit, wherein the at least a portion of the object identifier for the first content unit maps to a first zone of the plurality of zones that has an amount of at least one storage resource available that is below at least one threshold, revises the parsing information to split the first zone into at least two zones including the first zone and at least one new zone so that object identifiers that mapped to the first zone before the split map to either the first zone or the at least one new zone after the split.

Another embodiment is directed to a method of processing content in a computer system comprising at least one host and at least one storage system that comprises a plurality of zones, wherein the at least one host accesses content units stored on the at least one storage system using object identifiers, wherein the computer system maps each object identifier to one of the plurality of zones on the at least one storage system to which the corresponding content unit is allocated for storage, wherein the at least one storage system comprises a plurality of nodes, each of which is configured to receive and process access requests, wherein each of the plurality of nodes stores first information identifying which object identifiers map to which zones on the at least one storage system. The method comprises acts of: sending to each of the plurality of nodes second information, to replace the first information, that identifies which object identifiers map to which zones on the at least one storage system; sending to each of the plurality of nodes an indication of a future time associated with the second information; receiving, from each of the plurality of nodes, an acknowledgement of receipt of the second information; and in response to receiving the acknowledgement from each of the plurality of nodes, sending to each of the plurality of nodes a command to stop using the first information to map object identifiers to zones and to begin using the second information to map object identifiers to zones at the future time. A further embodiment is directed to at least one computer readable medium encoded with instructions that, when executed on a computer system, perform the above-described method.

Another embodiment is directed to at least one storage system configured to process access requests for content units from at least one host computer which identify content units using object identifiers. The at least one storage system comprises: a plurality of zones, each of which is configured to store content units; a plurality of nodes, each of which is configured to receive and process access requests, wherein each of the plurality of nodes stores first information identifying which object identifiers map to which zones on the at least one storage system; and at least one controller that: sends to each of the plurality of nodes second information, to replace the first information, that identifies which object identifiers map to which zones on the at least one storage system; sends to each of the plurality of nodes an indication of a future time associated with the second information; receives, from each of the plurality of nodes, an acknowledgement of receipt of the second information; and in response to receiving the acknowledgement from each of the plurality of nodes, sends to each of the plurality of nodes a command to stop using the first information to map object identifiers to zones and to begin using the second information to map object identifiers to zones at the future time.

A further embodiment is directed to a method of processing content in a computer system comprising at least one host and at least one storage system that comprises a plurality of zones, wherein the at least one host accesses content units stored on the at least one storage system using object identifiers, wherein a map defines a process for mapping an object identifier to one of the plurality of zones on the at least one storage system on which to store the content unit. The method comprises acts of: determining, at a first time, that at least one of the plurality of zones is unavailable to store additional content units; and defining a second process for mapping an object identifier to one of the plurality of zones, wherein the second process does not map object identifiers to the at least one unavailable zone. Another embodiment is directed to at least one computer readable medium encoded with instructions that, when executed on a computer system, perform the above-described method.

A further embodiment is directed to at least one storage system configured to process access requests, from at least one host computer, which identify content units using object identifiers, the at least one storage system comprising: a plurality of zones, each of which is configured to store content units; at least one memory configured to store a map that defines a process for mapping an object identifier to one of the plurality of zones on the at least one storage system on which to store the content unit; and at least one controller that: determines, at a first time, that at least one of the plurality of zones is unavailable to store additional content units; and defines a second process for mapping an object identifier to one of the plurality of zones, wherein the second process does not map object identifiers to the at least one unavailable zone.

DETAILED DESCRIPTION

As discussed above, in an OAS system content units are identified using object identifiers. Thus, one challenge faced in systems employing object addressable storage is determining the physical location of a content unit using its object identifier. This may be particularly challenging when the content unit may be stored on any one of a plurality of distinct zones. As used herein, the term zone refers to any collection of one or more physical or logical storage locations. For example, a zone may be an OAS system, a storage device (such as, for example, a disk drive, an optical disc, a solid state memory, or any other type of storage device), a file system, a directory or folder within a file system, and/or any suitable physical or logical storage location.

In some embodiments, an OAS system on which content units are stored may be a distributed storage system. As used herein, a distributed storage system refers to one made up of a number of separate nodes, where each node may be a separate machine with separate resources (e.g., processor, memory, disk, operating system). The nodes communicate with each other (e.g., through a network) to handle data access requests from one or more host computers. In such embodiments, a zone may be, for example, a node in the distributed storage system.

One technique for determining in which of a plurality of zones a content unit is stored using its object identifier is referred to herein as intrinsic locations, which is described in detail in co-pending U.S. patent application Ser. No. 10/731,603 (listed in Table 1 below and incorporated herein by references in its entirety). Intrinsic locations is a technique that employs at least a portion of the content address to determine one or more zones in which a content unit is stored.

Figure 1:
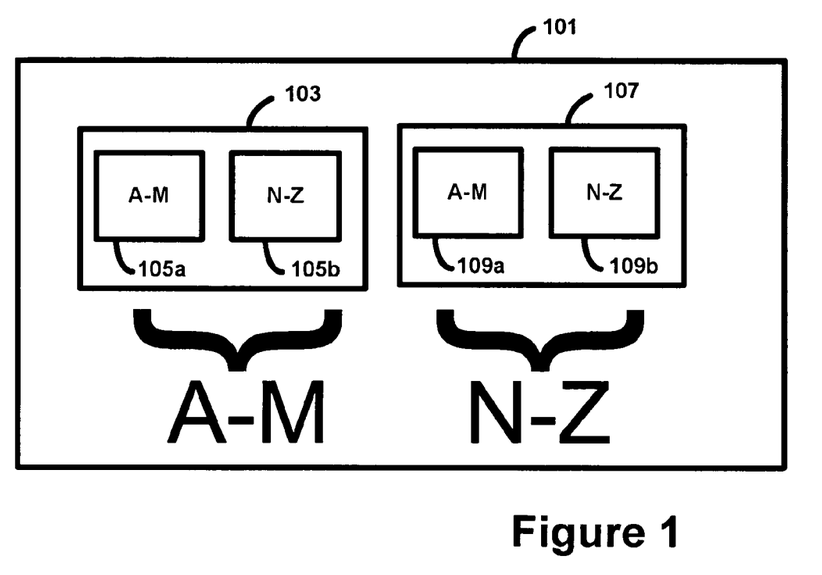
FIG. 1 is a block diagram of a storage system having multiple zones in which content units may be stored using an intrinsic location technique, in accordance with one embodiment of the invention.

FIG. 1 shows an illustrative system 101 that stores and locates content units using an intrinsic location technique. System 101 includes two zones (i.e., zones 103 and 107), and each of these zones includes two sub-zones. That is, zone 103 includes sub-zones 105*a* and 105*b*, and zone 107 includes sub-zones 109*a* and 109*b*. As one example, zones 103 and 107 each may be an OAS system, and sub-zones 105 and 109 each may be, for example, a disk drive in an OAS system. However, the invention is not limited in this respect, as zones 103 and 107 may be any suitable type of zone (examples of which are discussed above) and sub-zones 105 and 109 may be any suitable type of zone within larger zones 103 and 107, respectively.

In the example of FIG. 1, zone 103 is designated to store content units whose object identifiers have a first character whose values falls in a range from 'A'-'M' and zone 107 is designated to store content units whose object identifiers have a first character whose value is in a range of 'N'-'Z.' Similarly, sub-zone 105*a* may be designated to store content units whose object identifiers have a first character whose value falls in the range from 'A'-'M' and a second character whose value falls in the range from 'A'-'M,' while sub-zone 105*b* may be designated to store content units whose object identifiers have a first character whose values falls in the range from 'A'-'M' and a second character whose value falls in the range from N'-'Z.' Likewise, sub-zone 109*a* may be designated to store content units whose object identifiers have a first character whose value falls in the range from 'N'-'Z' and a second character whose value falls in the range from 'A'-'M,' while sub-zone 109*b* may be designated to store content units whose object identifiers have a first character whose value falls in the range from 'N'-'Z' and a second character whose value falls in the range from 'N'-'Z.' These designations may collectively be considered a mapping scheme for mapping object identifiers to zones.

In the example above (and in examples below), object identifiers are described as including characters in the range of 'A'-'Z.' It should be appreciated that this is for illustrative purposes and the invention is not limited in this respect. An object identifier may be a string of bits of any suitable length or any other type of identifier. There are defined numerical representations of alphanumeric and special characters, such as, for example, the eight bit American Standard Code for Information Interchange (ASCII) character codes, which map bit strings of eight bits to characters. Thus, in the example above, the first character of an object identifier may be, for example, the ASCII character corresponding to the first eight bits of the object identifier and the second character of an object identifier may be the ASCII character corresponding to the second eight bits of the object identifier.

When an access request to retrieve a content unit that identifies the content unit by its object identifier is received, the content unit may be located by parsing its object identifier. That is, the zone in which the content unit is stored may be determined based on the first character of the content unit and the sub-zone in which the content unit is stored may be determined based on the second character of the content unit.

In the example above, only the characters 'A'-'Z' are mapped to zones. It should be appreciated that this is a simplified example for illustrative purposes and any character or any string of bits, including any alphanumeric character or other character, may be mapped to a zone, as the invention is not limited in this respect.

When system 101 receives an access request to store a content unit, in may be determined in which of zones 103 and 107 to store the content unit based upon the first character of the object identifier for the content unit. For example, if the first character is in the first half of the alphabet, then the content unit may be stored in zone 103 and if the first character is in the second half of the alphabet, then the content unit may be stored in zone 107. It may also be determined in which sub-zone to store the content unit. For example, if the second character of the object address for the content unit is 'A'-'M' then the content unit may be stored in either zone 105*a* or zone 109*a* (depending on the first character of the object identifier). If the second character of the object address for the content unit is 'N'-'Z' the content unit may be stored in either zones 105*b* or 109*b* (depending on the first character of the object identifier).

Further, in the example above the first character of an object identifier for a content unit is used to determine in which zone to store the content unit and/or in which zone the content unit is stored, and the second character of the object identifier is used to determine in which sub-zone to store the content unit and/or in which sub-zone the content is stored. However, the invention is not limited in this respect, as the object identifier may be mapped to one or more zones (and optionally sub-zones) in any suitable way. For example, other portions of the object identifier (i.e., rather than the first and second characters) may be used to map the content unit to a zone, such as, for example, using a single bit to map to a zone, rather than, for example, an ASCII character. Any sized portion of an object identifier may be used (e.g., one bit, eight bits, or any other suitable size), including the entire object identifier, to map the object identifier to one or more zones and/or sub-zones.

In some embodiments, the object identifier may be hashed and the resulting hash value may be used to determine in which zone the corresponding content unit is stored. Any suitable hashing algorithm may be used, as the invention is not limited in this respect. One example of hashing algorithm that may be used in some embodiments of the invention is performing a modulus operation. Thus, for example, in a system with two zones, the value of the object identifier modulo two may be used to determine in which zone the corresponding content unit is to be stored. The result of this operation is always either 0 or 1. Thus, for example, if the result is 0 the corresponding content unit may be stored in Zone 1, and if the result is 1 the corresponding content unit may be stored in Zone 2. For example, if the resulting hash value of an object identifier is 0 then the corresponding content unit may be stored in zone 103, whereas if the resulting hash value of an object identifier is 1 then the corresponding content unit may be stored in zone 107.

Moreover, though in the example above, the object identifier is used to identify both a zone and sub-zone for a content unit, the invention is not limited in this respect, as the object may be used to identify one zone (without identifying a sub-zone) or may be used to identify multiple sub-zones for a content unit. For example, in FIG. 1, sub-zones 105 and 109 may each have sub-zones within them, and each of these sub-zones may have sub-zones within them, etc. The object identifier for a content unit may identify each sub-zone in which the content unit is to be stored, and any number of sub-zones may be identified.

As discussed above, mapping certain portions of the object identifier for a content unit to zones in the system may facilitate locating the content unit. However, Applicants have appreciated that this technique for locating content units using an object identifier presents certain challenges. For example, in some situations, when a request to store a content unit is received, a zone may be selected to store the content unit by parsing its object identifier (as described above). However, the selected zone may be unavailable to store the content unit for any of a number of reasons (e.g., due to lack of storage capacity or hardware failure). Further, in some situations, new zones may be added to the system and the mapping scheme used to map content units to zones (i.e., based on the object identifiers for the content units) may change. For example, if a system includes two zones, content units whose object identifiers have 'A'-'M' as the first character may map to the first zone and content units whose object identifiers have 'N'-'Z' as the first character may map to the second zone. If a third zone is subsequently added to the system (e.g., because additional hardware resources are added to the system or for some other reason), the existing mapping scheme should be modified because it may not store any content units in the third zone and the storage space allocated to the third zone may be unused.

In one embodiment, when changes occur that change the number of zones available (e.g., by increasing or decreasing the number of zones), a new mapping scheme may be established to handle the new zone configuration and temporal information may be used to determine which mapping scheme should be used to retrieve content.

For example, when a zone becomes full and therefore unavailable to store additional content units, a revised mapping scheme may be employed which omits the full zone. Thus, for example, stored content units will not be stored in the full zone. However, techniques are used to ensure that content units stored on the full zone can be retrieved. For example, in one embodiments, requests for content units that were stored prior to the change in mapping scheme may be located using the original mapping scheme, and content units that are stored after the changing in mapping scheme may be located using the revised mapping scheme.

Information that indicates which mapping scheme was in use during a given period of time may be stored and may be used to determine which mapping scheme to use to locate a content unit. This information may be stored in any suitable format and in any suitable location, as the invention is not limited in this respect. In the example above, there are two mapping schemes (i.e., an original mapping scheme and a revised mapping scheme). However, the invention is not limited in this respect as any suitable number of mapping schemes may be used.

Figure 2:
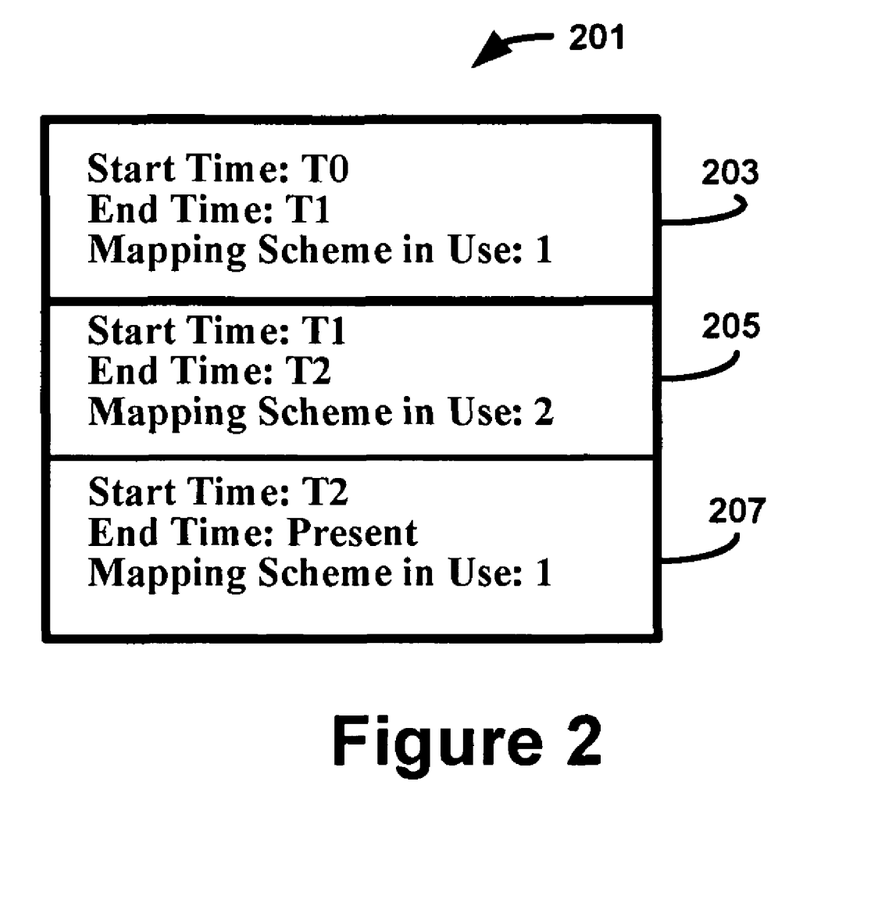
FIG. 2 is a block diagram of a table comprising mapping information that specifies storage locations of content units stored on a storage system, in accordance with one embodiment.

In some embodiments, the information indicating which mapping scheme was in use during a given a period may be stored in a table, such as, for example, table 201, in FIG. 2. For example, in a system with three zones, the system may employ a mapping scheme ("mapping scheme 1") in which content units are stored on all three zones. If, at a certain time, one of the zones becomes unavailable to store additional content units, a second mapping scheme ("mapping scheme 2") may be put into to use that maps object identifiers to the remaining two available zones. At some subsequent time, the unavailable node may again become available (e.g., because failed hardware in the zone is repaired or comes back online), and the system may resume using "mapping scheme 1." Thus, table 201 has an entry 203 indicating that "mapping scheme 1" was in use from time T0 to time T1 (e.g., where time T1 is the time one of the nodes became unavailable) and entry 205 indicating that from time T1 to time T2 "mapping scheme 2" was in use (e.g., where time T2 is the time that the unavailable node became available again). Table 201 also has an entry 207 indicating that from time T2 to the present, "mapping scheme 1" was again in use.

In the example of FIG. 2, table 201 indicates that a particular mapping scheme was in use during a particular period of time using an identifier for the mapping scheme (e.g., "mapping scheme 1" and "mapping scheme 2"). It should be understood that the invention is not limited in this respect as the information specifying the mapping schemes in use during particular periods of time may reference the mapping scheme in any suitable way, e.g., using an identifier for the mapping scheme (as in table 201), providing the mapping algorithm itself, or in any other suitable way.

In addition, in some embodiments, the mapping scheme itself may specify the number and configuration of zones in the storage system at the time the mapping scheme is in use. For example, "mapping scheme 1" may specify that it maps content units to zones 1-4 of the storage system, whereas "mapping scheme 2" may specify that it maps content units to zones 1-5 of the storage system. However, the invention is not limited in this respect, as the number and configuration of zones in the storage system at a time a mapping scheme is in use may specified in any suitable way. For example, in some embodiments, this information may be stored with the information indicating the times during which particular mapping schemes were in use (e.g., table 201).

When an access request to retrieve a content unit is received, the system may locate the content unit using its object identifier by first determining what mapping scheme was in use at the time the content unit was stored and then applying this mapping scheme to the object identifier to determine the zone in which the content unit was stored.

Table 201 is one example of a way that information regarding which mapping scheme was in use during a particular period of time may be stored. It should be appreciated that the invention is not limited in this respect, as such information need not be stored in a table and may be stored in any suitable way and in any suitable format.

Figure 3:
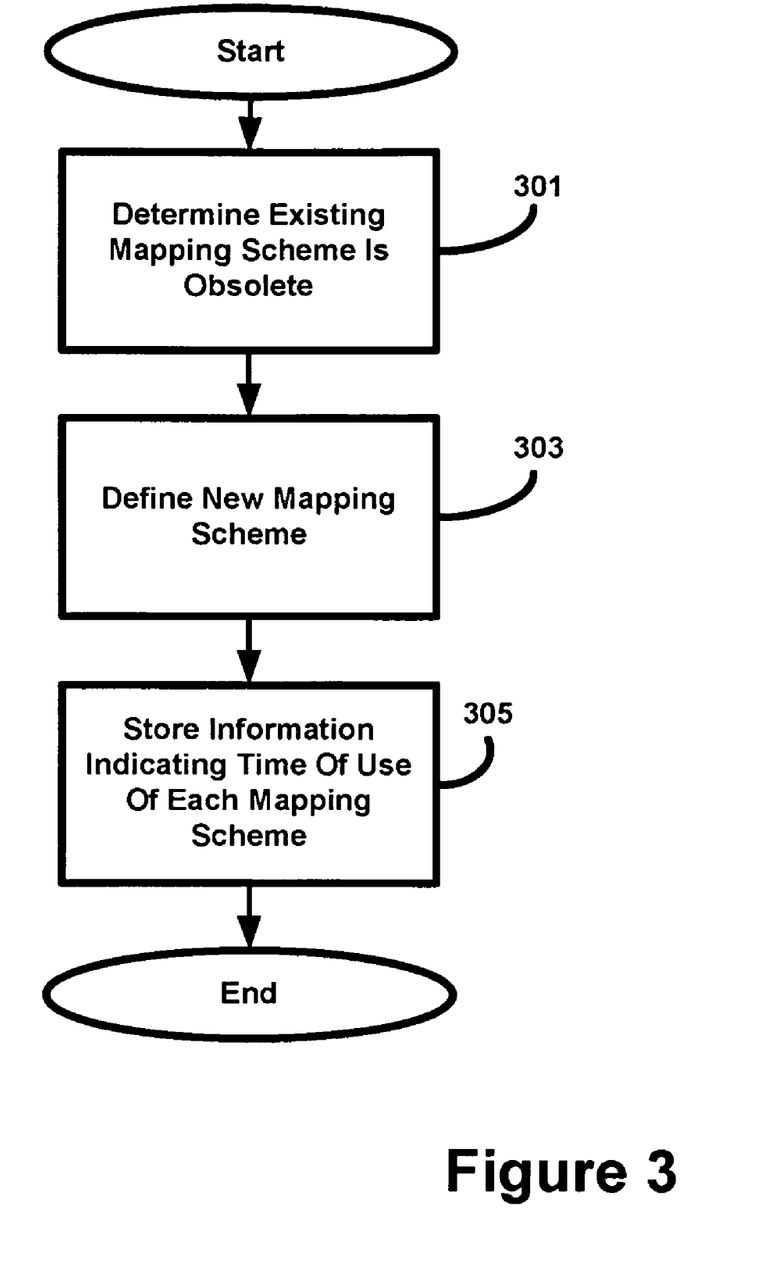
FIG. 3 is a flow chart of a process for locating content units on a storage system, in accordance with one embodiment.

An illustrative process for modifying a mapping scheme is shown in FIG. 3. At act 301, it is determined that the mapping scheme currently in use is obsolete, for example, due to changes in the system (e.g., a zone becoming available or a new zone being added to the system). This determination may be made in any suitable way, as the invention is not limited in this respect. For example, in some embodiments, it may be determined that a zone is unavailable when an attempt to access the zone fails. In some embodiments, for example, the system may track the available storage capacity of each zone. If a zone has no available storage capacity, the zone may be regarded as unavailable. Any other suitable technique for determining whether a mapping scheme is obsolete may be used.

Once it is determined that the existing mapping scheme is obsolete, the process continues to act 303 where a new mapping scheme is defined. The new mapping scheme may be defined in any suitable way, as the invention is not limited in this respect. For example, the mapping scheme may be defined automatically based, for example, on the number of available zones, or may be defined for example by a human operator or system administrator.

The process next continues to act 305, where information may be stored indicating the time that the previously-used mapping scheme went out of use and the new mapping scheme came into use. As discussed above, such information may be stored in any suitable format and in any suitable location, as the invention is not limited in this respect.

When a request is received to retrieve a content unit, the stored information may be used to determine which mapping scheme was in use when the content unit was initially stored. The request may identify the requested content unit using its object identifier. Once the request is received, the time the content unit was initially stored is determined. This determination may be made in any suitable way, as the invention is not limited in this respect. In some embodiments, the object identifier may include a timestamp that indicates the time of initial storage of its corresponding content unit. In such embodiments, the time of initial storage of the content unit may be obtained from the object identifier. However, the determination of the initial time of storage of a content unit may be made in any other suitable way.

Once the time of initial storage of the content unit is determined, the mapping scheme in use when the content unit was stored may be determined, for example, using the information created in act 305 of FIG. 3. If the first mapping scheme was in use when the content unit was stored, the first mapping scheme may be used to map the object identifier to a zone in which the content unit is stored. If the second mapping scheme was in use when the content unit was stored, the second mapping scheme may be used to map the object identifier to a zone in which the content unit is stored.

The above-described processes for modifying a mapping scheme and locating a content unit are illustrative, as these processes may be performed in any suitable way and the invention is not limited in this respect. For example, in the examples above, the mapping scheme used to store a content unit is determined based on the time of storage of content unit. However, the invention is not limited in this respect, as the mapping scheme used to store a content unit may be identified in other ways.

In embodiments in which the storage system(s) on which content units are stored are distributed storage systems, modifying the mapping scheme used by a storage system may present challenges. As discussed above, a distributed storage system is one made up of a number of separate nodes, where each node may be a separate machine with separate resources (e.g., processor, memory, disk, operating system). The nodes communicate with each other (e.g., through a network or otherwise) to handle data access requests from one or more host computers. Multiple nodes within the distributed storage system may be capable of handling access requests for content units and/or storing content units. Thus, content units stored on the distributed storage system may be distributed across multiple nodes in the storage system. The mapping scheme employed by a distributed storage system may be used to determine on which node a content unit is to be stored and/or on which node a requested content unit is stored.

Because multiple nodes in a distributed storage system may receive and process access requests and the node that processed a request to store a content unit may not necessarily be the node that processes a subsequent access request to retrieve the content unit, it is desirable that, when a mapping scheme is changed, all nodes that process access requests begin to use the new mapping scheme at the same time (within some acceptable tolerance). This may be accomplished in any suitable way, as the invention is not limited, in this respect.

Figure 5:
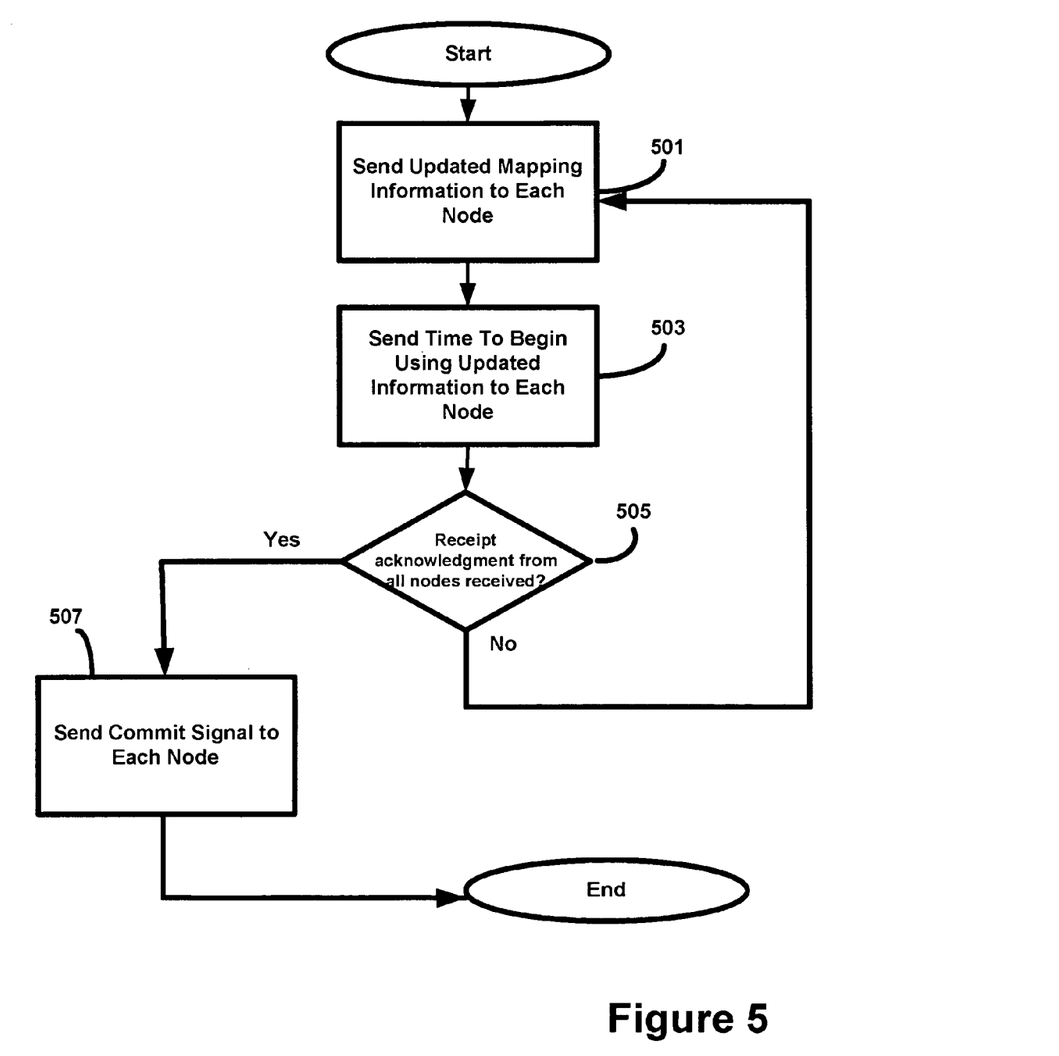
FIG. 5 is a flow chart of a two-phase commit process, in accordance with one embodiment.

In some embodiments, for example, simultaneous (or very near simultaneous) adoption of a new mapping scheme may be accomplished by using a technique referred to herein as a two-phase commit. An illustrative process for performing a two-phase commit is shown in FIG. 5. The process assumes that each node that processes access requests in the distributed storage system has a clock and the clocks of these nodes are synchronized. Synchronization may be achieved in any suitable way, as the invention is not limited in this respect. The process of FIG. 5 begins at act 501, where updated mapping information is sent to each node. The updated mapping information may be in any suitable form, as the invention is not limited in this respect. For example, an updated table, such as table 201 in FIG. 2, that indicates when each mapping scheme was in use may be distributed to each of the nodes.

The process then continues to act 503, where a future time at which to begin using the updated mapping information may be sent to each node. The indication of the time to begin using updated information may be in any suitable format and may specify any suitable future time, as the invention is not limited in this respect. In some embodiments, a future time may be selected to provide enough time for all nodes to which the new mapping scheme was sent to receive the new mapping scheme.

In some embodiments, the future time at which to begin using the updated mapping information may be sent to a node with the updated mapping information in a single transmission. Thus, each node may be sent a single transmission that includes the mapping information and the indication of the future time. Moreover, in some embodiments, the mapping information itself may specify the future time. For example, the mapping information may comprise a table, such as, for example, table 201 in FIG. 2, and the start time of the new mapping scheme specified in the table may be used by each node as the indication of the future time.

The invention is not limited to sending the mapping information and the indication of the future time together, as in some embodiments, the mapping information and indication of the future time may be sent to a node separately. Thus, for example, each node may receive at least two transmissions, at least one of which includes at least some of the mapping information and at least one of which includes the indication of the future time.

An acknowledgement receipt of the updating mapping information and indication of the future time is then awaited from each of the nodes. At act 505, it is determined if such an acknowledgement receipt from each node has been received. If so, the process continues to act 507, where a commit signal is sent to each node. The commit signal is an indication that the node should begin using the updated mapping information at the future time specified in act 503. If the nodes do not receive a commit signal, they will not use the updated mapping information.

If, at act 505, one or more nodes have not acknowledged receipt of the updated mapping information and/or the indication of the future time, the process may return to act 501, wherein the new mapping information and new indication of a future time maybe re-sent to the nodes. Alternatively, in some embodiments, rather than re-send the updated mapping information and future time to all nodes, this information may be re-sent to the nodes that have not acknowledged receipt. Finally, in some embodiments, the process may be aborted and a new mapping scheme may be defined that does not map object identifiers to the non-responsive node or nodes. The process of FIG. 5 may be repeated excluding the non-responsive node or nodes.

In some embodiments, rather than use the above-described two-phase commit process so that nodes begin using updated mapping information at the same time, a zone cleanup may be performed after a node has begun using the updated mapping information. That is, for example, a time may be designated at which a new mapping scheme is to come into use and the updated mapping information may be sent to each node. If a node begins using the updated mapping information after the designated time, content units stored on that node after the designated time may be identified. It may then be determined if these content units are stored on the proper node (using the update mapping information) and, if they are not, they may be moved to the proper node.

Modifying the mapping scheme that the system uses to allocate content units to particular zones allows content units to be stored in available zones when one or more zones become unavailable and to store content units in new zones when new zones are added to the system. As discussed above, information indicating the time during which each mapping scheme was in use may be employed to assist in locating a content unit. The size of this information may sometimes become large, for example, due to intermittent hardware failure (i.e., hardware frequently failing and coming back online) or other reasons. For example, if a zone repeatedly becomes unavailable and then available, the mapping scheme used by the system may be repeatedly altered as the zone becomes available and unavailable. Each time the mapping scheme is altered, new entries may be added to the information indicating the time during which each mapping scheme was in use. This may cause the size of this information to grow.

As the size of this information increases it may become unwieldy, increasing the time taken and the processing resources used to locate a content unit. For example, the information may become too large to store entirely in memory. Thus, some portions (e.g., less frequently accessed portions) may be paged out to disk while only some portions (e.g., more frequently accessed portions) are stored in memory. However, accessing the portions of this information stored on disk may take longer and increase the time needed to locate a content unit. Thus, it may be desirable to locate content units without having to access information that specifies the mapping schemes in use when the content units were initially stored.

In some embodiments, when the object identifier of a content unit to be stored maps to an unavailable zone, rather than modify the mapping scheme so that the object identifier maps to an available zone, the object identifier may be modified so that it maps to an available zone. This may be done in any suitable way, as the invention is not limited in this respect.

In some embodiments, an object identifier for a content unit to be stored on a storage system may be computed by the host computer that issues the request to store the content unit. For example, when the host computer issues a request to the storage system to store a content unit, it may provide in the request the content unit to be stored and the object identifier for the content unit. When the request is received by the storage system, the zone in which a content unit is to be stored may be determined by mapping the object identifier provided in the request to a zone. If the zone to which the object identifier maps is unavailable, the storage system may modify the object identifier so that it maps to a zone that is available.

Figure 4:
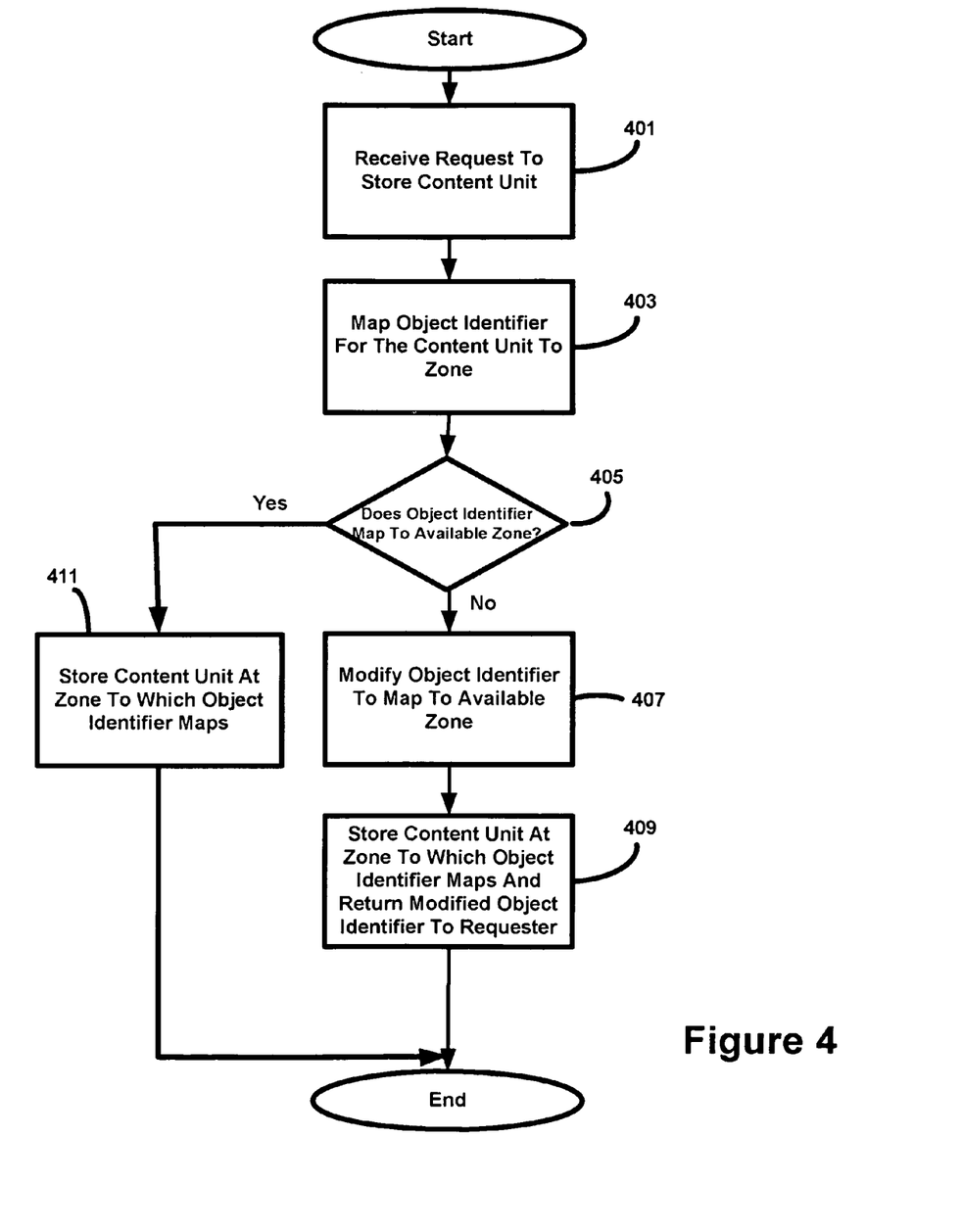
FIG. 4 is a flow chart of a process for modifying an object identifier to map to an available zone, in accordance with one embodiment.

An illustrative process for modifying an object identifier to map to an available zone is shown in FIG. 4. The process begins at act 401 where the storage system receives a request to store a content unit. The process then continues to act 403, where the storage system maps the object identifier for the content unit to a zone on the storage system. The process then continues to act 405, where the storage system determines if the object identifier maps to an available zone. This may be done in any suitable way, as the invention is not limited in this respect, and may not be an act performed on all access requests, but could result, for example, from receiving an error indicating in processing an access request.

If the object identifier does not map to an available zone, the process continues to act 407, where the storage system modifies the object identifier to map to an available zone. The storage system may modify the object identifier in any suitable way. For example, the storage system may modify the object identifier without targeting any particular available zone (e.g., by incrementing the object identifier or a portion thereof until it maps to an available zone) or may select a zone to store the content unit and modify the object identifier so that it maps to the selected zone. The storage system may select a zone in which to store the content unit based on any suitable criterion or criteria. For example, the storage system may select one of the available zones based on which zone has the most available storage capacity, based on some other load balancing criterion or criteria, or in any other suitable way.

The process next continues to act 409, where the storage system stores the content unit at the zone to which the modified object identifier maps and returns the modified object identifier to the host computer so that the host computer can use this object identifier to identify the content unit in subsequent access requests. If the original object identifier for the content unit is determined at act 405 to map to an available zone, the storage system may store the content unit at the zone to which the object identifier maps.

In the example above, the host computer computes the object identifier for a content unit and provides the object identifier for a content unit to the storage system with the request to store the content unit on the storage system. However, the invention is not limited in this respect, as in some embodiments the modification of an object identifier to map to a different zone can be implemented in a system wherein the host computer does not compute the entire object identifier for a content unit and/or provides only a portion of the object identifier to the storage system with a request to store a content unit. That is, in some systems, when the host computer sends a request to the storage system to store a content unit, the host computer may provide the portion of the object identifier that is used to map the object identifier to a zone on the storage system, but not the entire object identifier. For example, if the first character of the object identifier is used to determine in which zone its corresponding content unit is to be stored, the host computer may send the first character of the object identifier to the storage system along with the request, but not the entire object identifier.

Providing only a portion of the object identifier (but not the entire object identifier) from the host computer to the storage system may be particularly useful in embodiments in which the OAS system is a content addressable storage (CAS) system. In a CAS system, a content unit is identified using an object identifier that is a content address, at least a portion of which is generated from at least a portion of the content of the content unit that it identifies. For example, the content address for a content unit may be generated by hashing the content and using the resulting hash value as the content address for the content unit. Using the hash value as the content address provides the ability to verify that a content unit retrieved from the storage system has not been modified or corrupted since it was stored. This may be done, for example, by again hashing the content unit upon retrieval from the storage system and determining if the resulting hash value matches the content address.

In some situations, two separate content units may yield the same hash value. Thus, the hash value may not uniquely identify the content unit to which it corresponds. In some systems, a guaranteed unique identifier (GUID) may be included with the hash value in the content address for the content unit. Because the content address includes the hash value (generated from the content of the content unit) as well as the GUID, the ability to verify that a content unit has not been modified based on the content address is still available. In some embodiments of the invention, the GUID may be included in (or comprise the entire) portion of the object identifier that is used to map to a zone in which to store the corresponding content unit.

In some systems, the hash value of the content address is generated on the storage system. Application programs executing on the host computer that store content units on a CAS system may communicate with the CAS system through an application programming interface (API). The API may handle communication with the CAS system to shield the application program from the particulars of storing content on the CAS system (e.g., communicating according to the protocols of the CAS system, GUID generation, and other particulars). Thus, when an application program initiates an access request to be sent to the CAS system, it may provide the content to be stored to the API. However, because the size of the content may be large, the API may stream the content out to the CAS system as it comes in from the application program (e.g., because the API may not have a buffer large enough to store all of the content). Because the API does not have all of the content at once, it would be difficult for the API to compute the hash value for the content address of the content unit. Thus, in such situations, it may be desirable to compute the hash value for the content address at the storage system.

As discussed above, in some embodiments, the GUID portion of a content address may be used to map the content unit identified by the content address to a zone on the storage system at which the content unit is to be stored. In some embodiments, the GUID may be generated by the API on the host computer and provided to the storage system with the request to store the content unit identified by the content address. Using the GUID to map the content unit identified by the content address to a zone on the storage system may reduce the processing burden on the storage system. That is, when a storage system receives a content unit to be stored (e.g., as part of an access request to store the content unit), the storage system may not have a buffer large enough to store the entire content unit. Thus, as the content for the content unit is streamed in, it may be desirable to store the content unit in its ultimate destination, rather than store it in a temporary location, determine the proper zone in which to store the content unit, and then move the content unit to that zone. Because the GUID is provided with the request to store the content unit, in some embodiments, the storage system may use the GUID to map the content unit to the appropriate zone and store the content unit in that zone as it is streamed in.

Thus, in some embodiments in which content units are stored on a CAS system, the storage system may use the GUID received from the host computer to map the content unit to be stored to a zone on the CAS system. If the zone to which the GUID maps is unavailable, the CAS system may modify the GUID so that it maps to an available zone. Once the content unit is stored in an available zone, the CAS system may compute the remainder of the content address in any suitable way (e.g., by computing the portion of the content address that is based on the content of the content unit). The CAS system may then combine this portion with the modified GUID to generate the complete content address and may return the content address to the host computer. In some embodiments, the content address for a content unit may include information in addition to the GUID and the portion of the content address generated using the content of the content unit. Such information may include, for example, a timestamp that indicates the time of initial storage of a content unit. The timestamp may be generated by the host computer and sent to the storage system with the request to store the content units, may be generated by the storage system, and/or may be generated by another computer in the system.

In the examples above, when the storage system determines that an object identifier or a portion of an object identifier, such as a GUID, maps to an unavailable zone, the storage system modifies the object identifier or portion of an object identifier so that it maps to an available zone. However, the invention is not limited in this respect, as this modification need not be performed by the storage system and may be performed by any suitable entity. For example, in some embodiments, when the storage system determines that an object identifier or portion of an object identifier maps to an unavailable zone, the storage system may send a request to the host computer that issued the storage request to provide a new object identifier or portion of an object identifier. Thus, the host computer may modify the object identifier or portion of the object identifier (or generate a new object identifier or portion of an object identifier) and provide it to the storage system. This may be performed by any suitable entity on the host computer, such as, for example, the API through which application programs communicate with the storage system. The modification of the object identifier or portion of the object identifier may be performed by any suitable entity in the computer system, as the invention is not limited in this respect. In some embodiments, a computer coupled between the host computer and the storage system (e.g., an appliance) may perform such modification.

Applicants have appreciated that, in some situations, it may be desirable to store multiple content units that are logically related to each other in the same zone. For example, it is probable that, due to the logical relation between the content units, they will be accessed proximate in time to each other. Storing logically related content units together in the same zone may reduce the time needed to access them. Situations in which it may be desired to store multiple logically related content units in the same zone may arise, for example, in storage systems that employ a blob/content descriptor file (CDF) architecture, or in other types of storage systems.

In storage systems that employ a blob/CDF architecture, at least two types of content units may be stored. A first type, referred to as a blob, is a content unit that stores application data of any type (e.g., a patient x-ray, company financial records, or any other type of data). A second type of content unit is referred to as a content descriptor file (CDF). Each blob has at least one CDF associated with it. The CDF may include metadata and one or more references. These references may be, for example, references to blobs and/or other CDFs referenced by the CDF. The metadata in the CDF may be metadata about the data stored in the blobs and/or other CDFs referenced by the CDF. Examples of systems that use a blob/CDF architecture are described in many of the applications listed below in Table 1.

As an example, three different x-rays of a patient may be stored in three separate blobs. A CDF may store references to each of these blobs as well as metadata about each blob. This metadata may include, for example, the name of the patient, the date each x-ray was taken, the location that the x-ray was taken, a physician's comments on the x-rays, and/or any other suitable metadata. Blobs may be accessed via their corresponding CDFs. Thus, for example, to access one of the x-rays, a host computer may issue a request for the corresponding CDF using the object identifier for the CDF, determine the blobs that are desired via the metadata in the CDF, and issue a subsequent request for the desired blobs using the references to the blobs stored in the CDF. As a result, it is likely that a CDF and the blob or blobs that it references will be retrieved from the storage system proximate in time. Applicants have appreciated that it may be desired to store a CDF and the blobs or other CDFs it references in the same zone to potentially reduce the access time for these content units when it is desired to retrieve them proximate in time. In addition, when a CDF is deleted, it may be desired to access the other content units (e.g., blobs and/or CDFs) that it references to determine if these other content units may also be deleted. If these content units are stored in the same zone as the CDF, the time needed to access them upon deletion of the CDF may be reduced.

CDFs and blobs are only an example of logically related content and other types may exist, including content stored in systems that do not employ a blob/CDF architecture.

Storing logically related content units in the same zone may be done in any suitable way, as the invention is not limited in this respect. For example, in some embodiments, the logically related content units may be stored as part of a single transaction and the portion of the object identifier that is used to map to a zone may be assigned to be the same for each content unit in the transaction. Thus, for example, if the object identifier includes a GUID that is used to map its corresponding content unit to a zone, the object identifier for each content unit in the transaction may have the same GUID.

Thus, in some embodiments, the host computer may initiate a transaction to store multiple content units to the storage system by sending a request to store a first of the content units in the transaction. The host computer may provide the portion of the object identifier to be used in the object identifiers for each of the content units (e.g., the GUID) with the request. If storage system determines that this portion of the object identifier maps to an unavailable zone, an alternate zone may be selected. This may be done in any suitable way, examples of which are provided above. For example, the storage system may send a request to the host computer to modify this portion of the object identifier and the host computer may send a second request to store a second of the content units in the transaction and provide the modified portion of the object identifier to the storage system along with the second request. This is but one of many ways that an alternate zone for multiple content units may be selected, and the invention is not limited to any particular way.

Applicants have appreciated that there are challenges involved in storing multiple logically related content units in the same zone. One such challenge is that a zone may become unavailable after only some (but not all) of the multiple logically related content units have been stored in it. For example, the zone in which the multiple logically related content units are intended to be stored may run out of storage capacity after only one or some of the multiple content units are stored in the zone, and there may be no available storage capacity to store the remaining content units. Alternatively, a zone may experience hardware failure after only one or some of multiple logically related content units have been stored, and may be unavailable to store the remainder of these content units.

In some embodiments, if a node becomes unavailable during a transaction after some of the content units in the transaction have been stored, the storage system can fail the entire transaction and delete the content units in the transaction that have been stored. The host computer may then re-initiate the transaction and the portion of the object identifier for the content units in the transaction that is used to map to a zone may be modified (e.g., by the host computer, the storage system, or otherwise) so that it maps to a different zone.

In other embodiments, if a zone becomes unavailable during a transaction due to lack of storage capacity for additional content units, the content units that have already been stored in the zone may remain in the zone and the portion of the object identifier that maps to a zone (e.g., the GUID) for the content units in the transaction that have not yet been stored may be modified (e.g., by the host, the storage system, or otherwise) so that these content units are stored in an available zone.

The examples above describe embodiments in which an object identifier or a portion of an object identifier for a content unit that maps to an unavailable zone may be modified to map to an available zone. However, Applicants have appreciated that, in some situations, it may not be desirable to modify the object identifier for a content unit. Such a situation may arise, for example, when the unavailable zone is a target for content units that previously were stored on a storage system are being migrated to a new storage system. When migrating these content units to the new storage system, there may be a zone on the new storage system that does have capacity to store all the migrated content units that map to that zone. However, it may be undesirable to modify the object identifiers for these content units so that they map to a new zone because one or more host computers may identify the content units by their original object identifiers and it may be desired to continue to allow these host computers to use the original object identifiers to access the content units. For example, notifying these host computers that the object identifier has changed may be cumbersome or unfeasible.

In some embodiments, a zone that lacks capacity to store additional content units may be expanded. This may be performed, for example, in the situation described above where the zone is a migration target of another storage system, or in any other suitable situation. A zone may be expanded in any suitable way, as the invention is not limited in this respect. For example, the zone may be expanded by adding additional physical storage resources to the zone, while continuing to use the existing storage resources allocated to the zone. The additional physical storage resources may be allocated from existing storage devices in the storage system or new storage devices may be added to the system and storage capacity from the new storage devices may be allocated to the zone. Thus, for example, if a zone comprises a single disk drive that is full, the zone may be expanded by allocating an additional disk drive to the zone.

Alternatively, in some embodiments, the zone may be expanded by allocating new physical storage resources to the zone to replace the physical storage resources previously used by the zone, and the content units in the zone may be moved to the new physical storage resources. For example, if the zone currently comprises a 200 GB disk drive, the zone may be expanded by allocating to the zone a 500 GB disk drive, moving content units stored in the zone from the 200 GB disk drive to the 500 GB disk drive, and deallocating the 200 GB disk drive from the zone. The storage capacity of the storage resource(s) newly allocated to the zone may be selected in any suitable way, as the invention is not limited in this respect. In some embodiments, the storage capacity of the newly allocated storage resource(s) may be selected so that it is large enough to store the content units stored on the existing storage resouce(s) for the zone, plus additional content units being migrated from the other storage system that map to the zone.

In some embodiments, when additional storage resources are allocated to a zone to be used in conjunction with the existing physical storage resources of the zone, additional content units that map to the zone for which there was previously no storage capacity available may be stored using the additional storage resources, without moving content units previously stored in the zone. For example, if a zone comprises a disk drive within a storage system that has no additional storage capacity, an additional disk drive may be allocated to the zone to increase the storage capacity of the zone. New content units may be stored on the additional disk drive and content units previously stored in the zone may remain on the original disk drive. When a request to retrieve a content unit whose object identifier maps to the zone is received, the storage system may search both disk drives to locate the requested content unit.

Applicants have appreciated that, in some situations, it may be preferable to enable the storage system to determine the physical location of a content unit within a zone by analyzing the object identifier and without having to search for the content unit within the zone (e.g., by searching multiple disk drives). Thus, in some embodiments, when additional storage resources are allocated to a zone to be used in a conjunction with the existing physical storage resources of the zone, an additional mapping scheme may be defined that maps content units to either the existing storage resources or the new storage resources within the zone. For example, if a zone comprises a disk drive and an additional disk drive is allocated to the zone to increase its storage capacity, an additional mapping scheme may be defined that maps the object identifiers of content units that map to the zone to either the original disk drive or the additional disk drive. This may be done in any suitable way using any suitable mapping scheme, as the invention is not limited in this respect.

For example, in some embodiments a hash of the GUID of an object identifier may be used to map the object identifier to a particular a zone, and a different hash of the GUID may be used to map the object identifier to physical storage resources used within the zone (e.g., to create sub-zones). For example, if as in the example above, a zone includes two disk drives, the last bit of the GUID may be used to determine on which disk drive a content unit is stored. Thus, for example, if the last bit of the GUID of an object identifier is a '0,' the object identifier may map to the original disk drive, and if the last bit is a '1,' the object identifier may map to the newly allocated disk drive.

When additional storage resources are added to a zone to increase its storage capacity and an additional mapping scheme is defined to map object identifiers that map to the zone to the storage resources in the zone, content units previously stored in the zone that map, according to the newly defined mapping scheme, to the additional storage resources may be moved from the original storage resources to the additional storage resources. For example, if a new disk drive is allocated to the zone to supplement the existing disk drive of a zone and the new mapping scheme described in the example above is used, content units stored on the original disk drive whose object identifier has a GUID that ends in '0' may be left on the original disk drive and content units stored on the original disk drive whose object identifier has a GUID that ends in '1' may be moved to the additional disk drive.

Applicants have appreciated that when some of the content units of a zone are being transferred to an additional storage resource that has been allocated to the zone to increase its storage capacity, or when content units of a zone are being moved to a larger storage device that replaces the storage device previously allocated to the zone, the storage system may receive a read request to access a content unit stored in the zone. Because content units are in the process of being transferred from one storage resource to another storage resource, there is a risk that the storage system may not be able to determine, at the time of receipt of the read request, if the requested content is stored on the previously-allocated storage resources or the newly-allocated storage resources. Thus, in some embodiments, when content units are in the process of being transferred between storage resources, the storage system may search the multiple storage resources in the zone to determine on which one the requested content unit is stored.

As discussed above, in some embodiments of the invention a mapping scheme used to map object identifiers to zones may be modified or updated if there is a change of the number of available zones in the storage system. In some embodiments, when a transaction is initiated to store multiple content units there may be a significant amount of time elapsed between when one content unit in the transaction is sent to the storage system and a next content unit in the transaction is sent to the storage system. This amount of elapsed time may be on the order of minutes, hours, days, weeks, or any other suitable amount of time. Applicants have appreciated that in some situations the mapping scheme may change in the middle of such a transaction (e.g., if a zone is added or otherwise becomes available during the transaction or if a zone becomes unavailable during the transaction). Thus, in some situations, when the mapping scheme changes in the middle of a transaction, content units that are part of the same transaction may be stored in different zones.

Applicants have appreciated that, in some embodiments, if a zone goes offline (e.g., due to hardware failure) and a request to read a content unit stored in that zone is received by the storage system, the storage system may be unable to access the content unit on the zone. In some embodiments, the storage system may return an error message saying that the content unit is not found. In other embodiments, the storage system may perform a search of all storage (e.g., by searching all zones) to determine if the content unit is stored elsewhere on the storage system.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
| --- | --- | --- |
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention | 10/762,044 | Jan. 21, 2004 |

TABLE 1-continued

| Title | Ser. No. | Filing Date |
|---|---|---|
| Period For Data In A Storage System | | |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For' Accessing Content On A Storage System | 11/324,644 | Jan. 3, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing content in a computer system comprising at least one host and at least one storage system that comprises a plurality of zones, each of the zones employing at least one storage resource that is not employed by any other of the plurality of zones, wherein the at least one host accesses content units stored on the at least one storage system using object identifiers and the computer system parses at least a portion of the object identifier for a content unit to determine, using a mapping, which one of the plurality of zones the content unit is allocated to for storage and which storage resource in the one of the plurality of zones in which the content unit is stored stores the content unit, the method comprising acts of:

receiving a request to store a first content unit for which the at least a portion of the object identifier maps to a first zone of the plurality of zones;

determining, based on the available storage capacity of the first zone, whether the first zone is available to store the first content unit, where the first zone comprises at least one first storage resource;

in response to determining, based on the available storage capacity of the first zone, that the first zone is unavailable to store the first content unit, allocating, to the first zone, at least one second storage resource to increase the storage capacity of the zone; and in response to allocating the at least one second storage resource to increase the storage capacity of the zone, transferring at least some of the content stored on the at least one first storage resource to the at least one second storage resource, wherein transferring the at least some of the content to the at least one second storage resource comprises modifying the mapping to map the object identifiers for at least some content units stored on the at least one first storage resource to the at least one second storage resource, and selecting the content units whose object identifiers map to the at least one second storage resource as content units to be transferred from the at least one first storage resource to the at least one second storage resource.

2. The method of claim 1, wherein the act of transferring at least some of the content stored on the at least one first storage resource to the at least one second storage resource further comprises an act of transferring all of the content stored on the at least one first storage resource to the at least one second storage resource.

3. The method of claim 2, further comprising an act of:
de-allocating the at least one first storage resource from the first zone.

4. The method of claim 2, wherein the at least one second storage resource has a storage capacity greater than the at least one first storage resource.

5. The method of claim 1, further comprising an act of:
transferring the content stored on the at least one first storage resource that maps to the at least one second storage resource to the at least one second storage resource.

6. At least one tangible computer readable medium encoded with instructions that, when executed in a computer system comprising at least one host and at least one storage system that comprises a plurality of zones, each of which employs at least one storage resource that is not employed by any other of the plurality of zones, perform a method of processing content, wherein the at least one host accesses content units stored on the at least one storage system using object identifiers and the computer system parses at least a portion of the object identifier for a content unit to determine, using a mapping, which one of the plurality of zones the content unit is allocated to for storage and which storage resource in the one of the plurality of zones in which the content unit is stored stores the content unit, and wherein the method comprises acts of:

receiving a request to store a first content unit for which the at least a portion of the object identifier maps to a first zone of the plurality of zones;

determining, based on the available storage capacity of the first zone, whether the first zone is available to store the first content unit;

in response to determining, based on the available storage capacity of the first zone, that the first zone is unavailable to store the first content unit, allocating, to the first zone, at least one second storage resource to increase the storage capacity of the zone; and in response to allocating the at least one second storage resource to increase the storage capacity of the zone, transferring at least some of the content stored on the at least one first storage resource to the at least one second storage resource, wherein transferring the at least some of the content to the at least one second storage resource comprises modifying the mapping to map the object identifiers for at least some content units stored on the at least one first storage resource to the at least one second storage resource, and selecting the content units whose object identifiers map to the at least one second storage resource as content units to be transferred from the at least one first storage resource to the at least one second storage resource.

7. The at least one computer readable medium of claim 6, wherein the act of transferring at least some of the content stored on the at least one first storage resource to the at least one second storage resource further comprises an act of transferring all of the content stored on the at least one first storage resource to the at least one second storage resource.

8. The at least one computer readable medium of claim 7, wherein the method further comprises an act of:
  de-allocating the at least one first storage resource from the first zone.

9. The at least one computer readable medium of claim 7, wherein the at least one second storage resource has a storage capacity greater than the at least one first storage resource.

10. The at least one computer readable medium of claim 6, wherein the method further comprises an act of:
  transferring the content stored on the at least one first storage resource that maps to the at least one second storage resource to the at least one second storage resource.

11. At least one storage system configured to process access requests from at least one host computer that accesses content units on the at least one storage system using object identifiers, wherein the at least one storage system comprises:
  a plurality of zones, each of which employs at least one storage resource that is not employed by any other of the plurality of zones, wherein the at least one storage system parses at least a portion of the object identifier for a content unit to determine, using a mapping, which one of the plurality of zones the content unit is allocated to for storage and which storage resource in the one of the plurality of zones in which the content unit is stored stores the content unit; and
  at least one controller that:
    receives a request to store a first content unit for which the at least a portion of the object identifier maps to a first zone of the plurality of zones;
    determines, based on the available storage capacity of the first zone, whether the first zone is available to store the first content unit;
    in response to determining, based on the available storage capacity of the first zone, that the first zone is unavailable to store the first content unit, allocates, to the first zone, at least one second storage resource to increase the storage capacity of the zone; and
    in response to allocating the at least one second storage resource to increase the storage capacity of the zone, transfers at least some of the content stored on the at least one first storage resource to the at least one second storage resource, wherein transferring the at least some of the content to the at least one second storage resource comprises modifying the mapping to map the object identifiers for at least some content units stored on the at least one first storage resource to the at least one second storage resource, and selecting the content units whose object identifiers map to the at least one second storage resource as content units to be transferred from the at least one first storage resource to the at least one second storage resource.

12. The at least one storage system of claim 11, wherein the at least one controller transfers all of the content stored on the at least one first storage resource to the at least one second storage resource.

13. The at least one storage system of claim 12, wherein the at least one controller de-allocates the at least one first storage resource from the first zone.

14. The at least one storage system of claim 12, wherein the at least one second storage resource has a storage capacity greater than the at least one first storage resource.

* * * * *